United States Patent [19]

Katoh

[11] 4,370,682
[45] Jan. 25, 1983

[54] TAPE LOADING APPARATUS IN A RECORDING AND/OR REPRODUCING APPARATUS

[75] Inventor: Hiroshi Katoh, Yokohama, Japan

[73] Assignee: Victor Company of Japan, Ltd., Yokohama, Japan

[21] Appl. No.: 109,672

[22] Filed: Jan. 4, 1980

[30] Foreign Application Priority Data

Jan. 12, 1979 [JP] Japan .................................. 54-2683
Jan. 12, 1979 [JP] Japan .................................. 54-2684
Jan. 12, 1979 [JP] Japan .................................. 54-2685

[51] Int. Cl.³ .................... G11B 15/66; G11B 15/18; G11B 5/52
[52] U.S. Cl. ......................................... 360/71; 318/7; 242/186; 242/203; 242/75.51; 360/85
[58] Field of Search ............... 360/71, 74.3, 74.1, 360/85, 95, 96.1, 96.3; 318/6–7; 242/201–203, 75.51, 186

[56] References Cited

U.S. PATENT DOCUMENTS

| | | | |
|---|---|---|---|
| 3,444,445 | 5/1969 | Mullin | 242/203 |
| 3,823,896 | 7/1974 | Finkelstein | 360/95 |
| 3,825,944 | 7/1974 | Terao et al. | 360/85 |
| 3,864,742 | 2/1975 | Katoh | 360/85 |
| 3,969,766 | 7/1976 | Tanaka et al. | 360/85 |
| 3,982,160 | 9/1976 | Goldschmidt et al. | 242/186 |
| 4,056,833 | 11/1977 | Schulz | 360/85 |
| 4,060,840 | 11/1977 | Umeda | 360/85 |
| 4,156,257 | 5/1979 | Roberts | 360/74.3 |
| 4,160,195 | 7/1979 | Sakamoto | 318/7 |
| 4,172,231 | 10/1979 | Hiley et al. | 242/75.51 |
| 4,232,371 | 11/1980 | Kamoto | 242/75.51 |
| 4,256,996 | 3/1981 | Brooks et al. | 242/75.51 |

*Primary Examiner*—Alfred H. Eddleman
*Attorney, Agent, or Firm*—Louis Bernat

[57] ABSTRACT

A tape-loading device in an apparatus for recording and/or reproducing information signals on and/or from a recording tape comprises a mechanism for drawing a portion of the tape out of a cassette and loading the portion along a specific tape path, a supply-side reel motor for driving a reel disc on a tape-supply side in the cassette, a takeup-side reel motor for driving a reel disc on a takeup-side in the cassette, and an electrical circuit operating when the tape-loading means draws out the tape to apply voltages to the reel motors on the supply side and the takeup side such that an equal rotational torque is produced in each of the two motors in the direction of winding up the tape.

4 Claims, 21 Drawing Figures

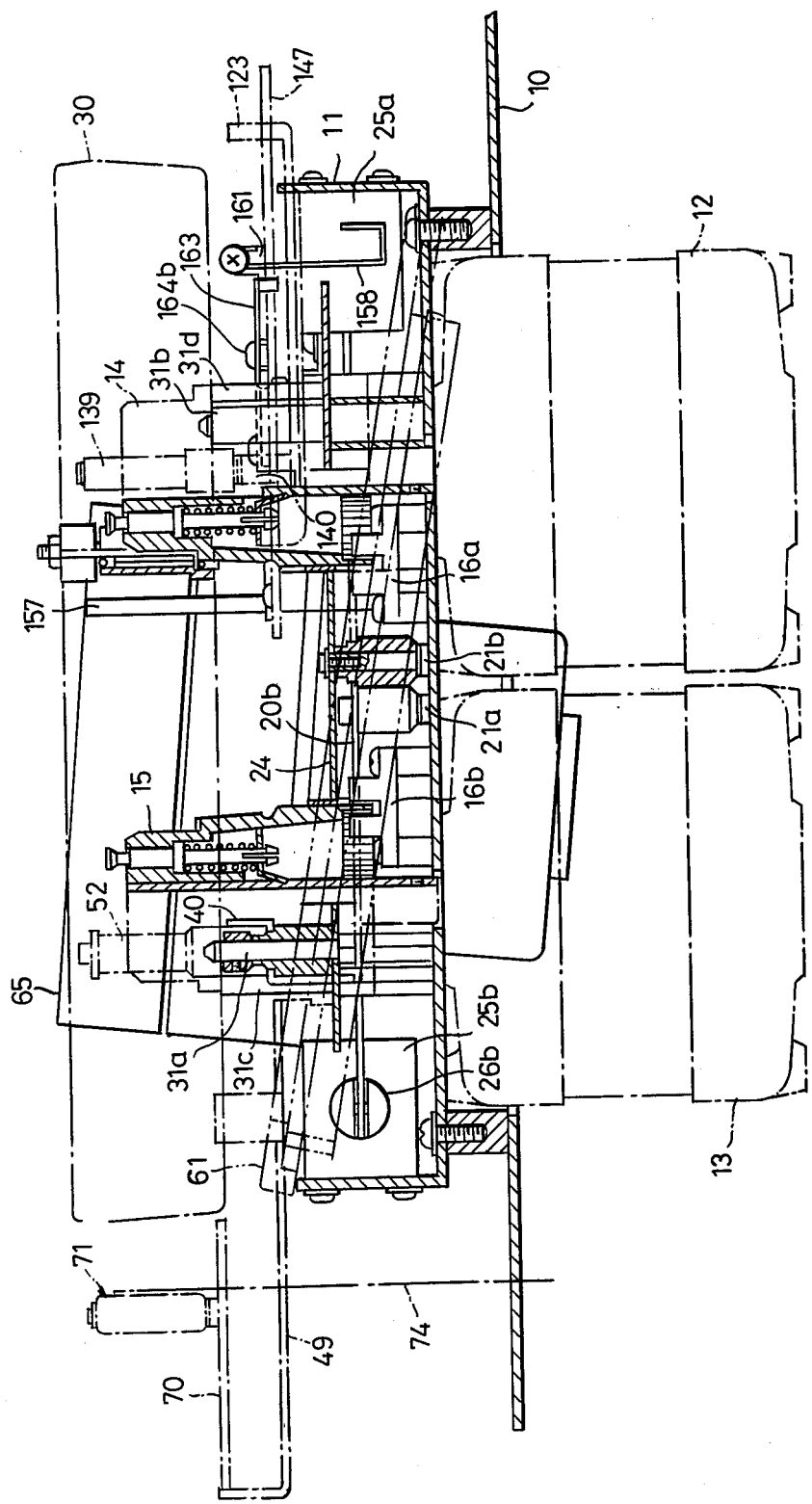

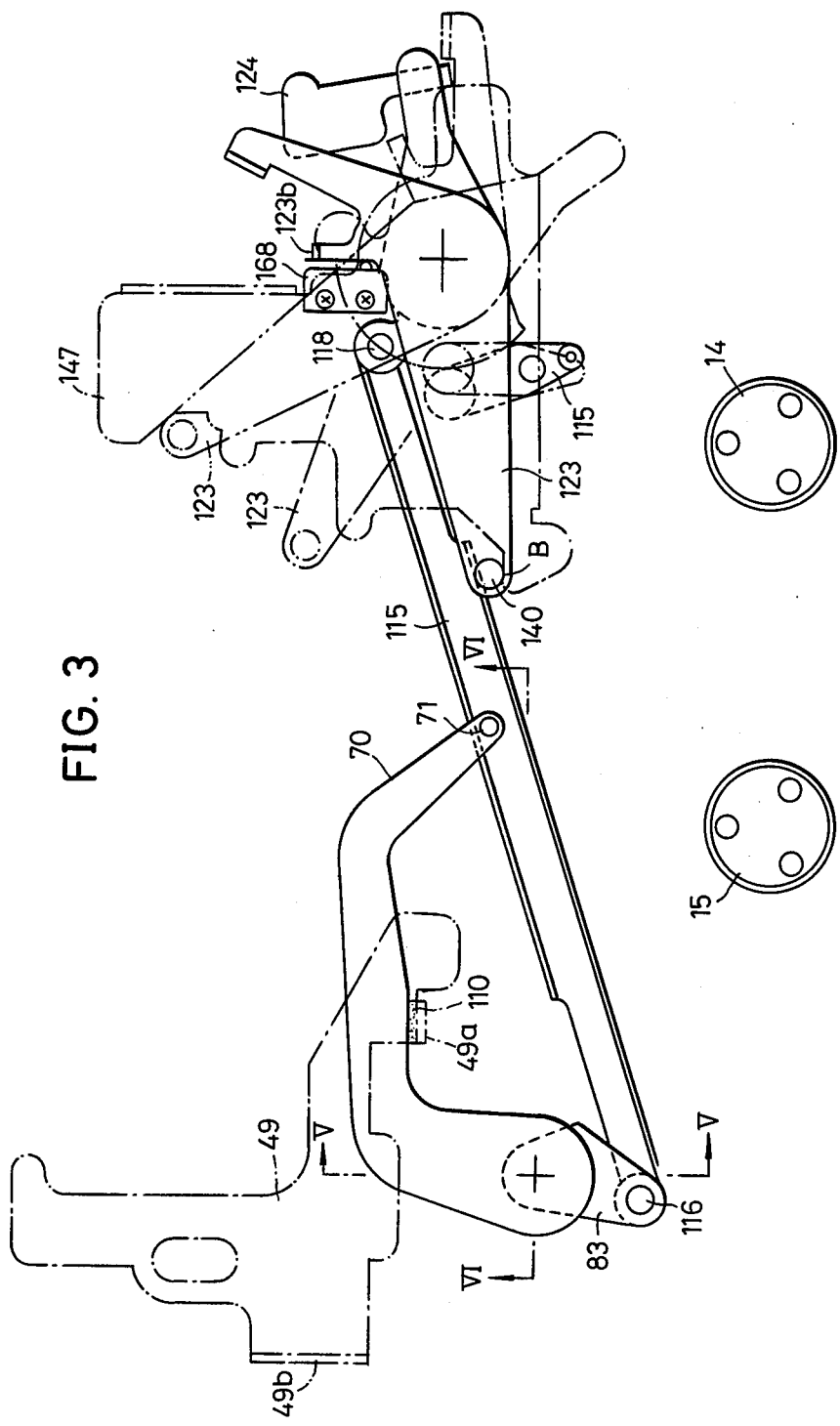

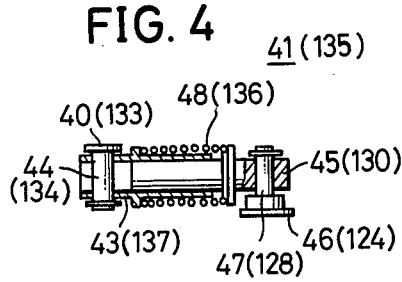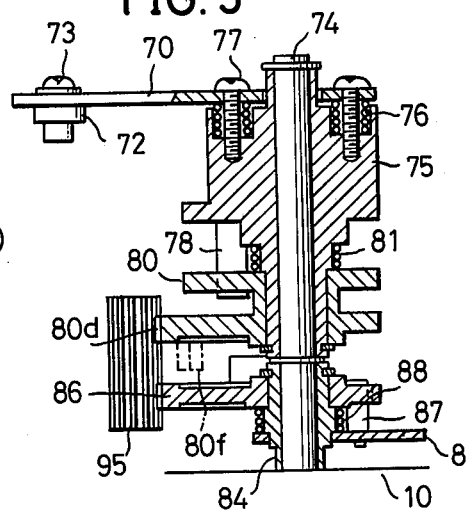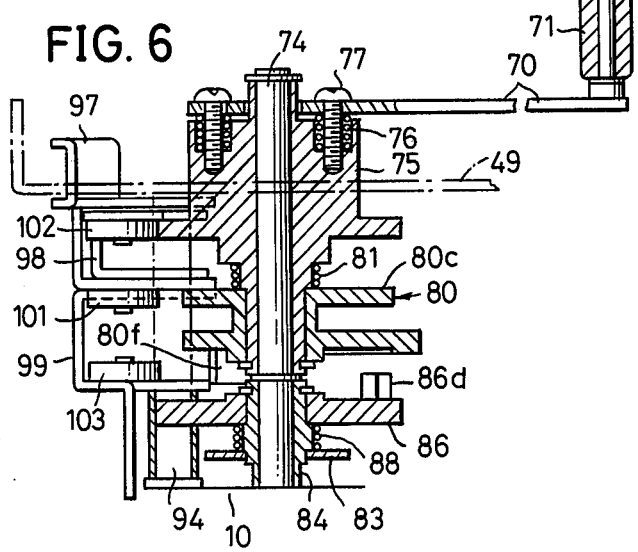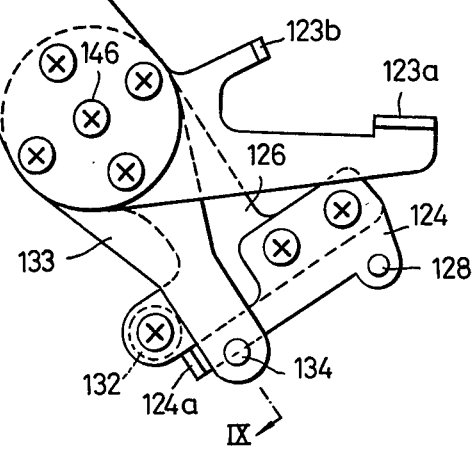

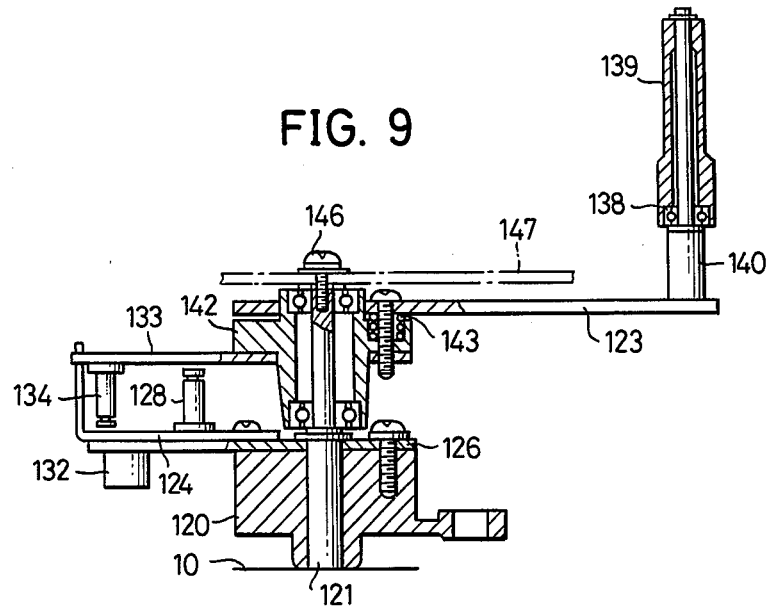
FIG. 9
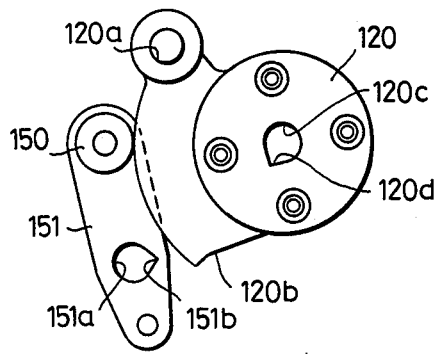
FIG. 10
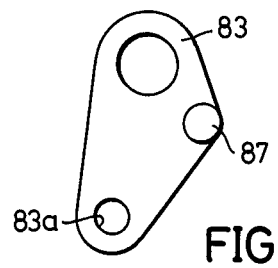
FIG. 11
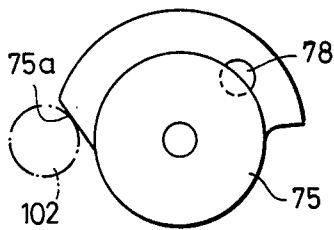
FIG. 12
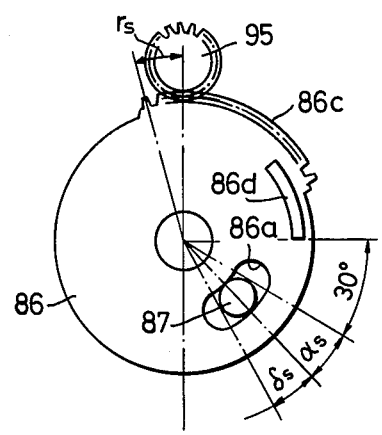

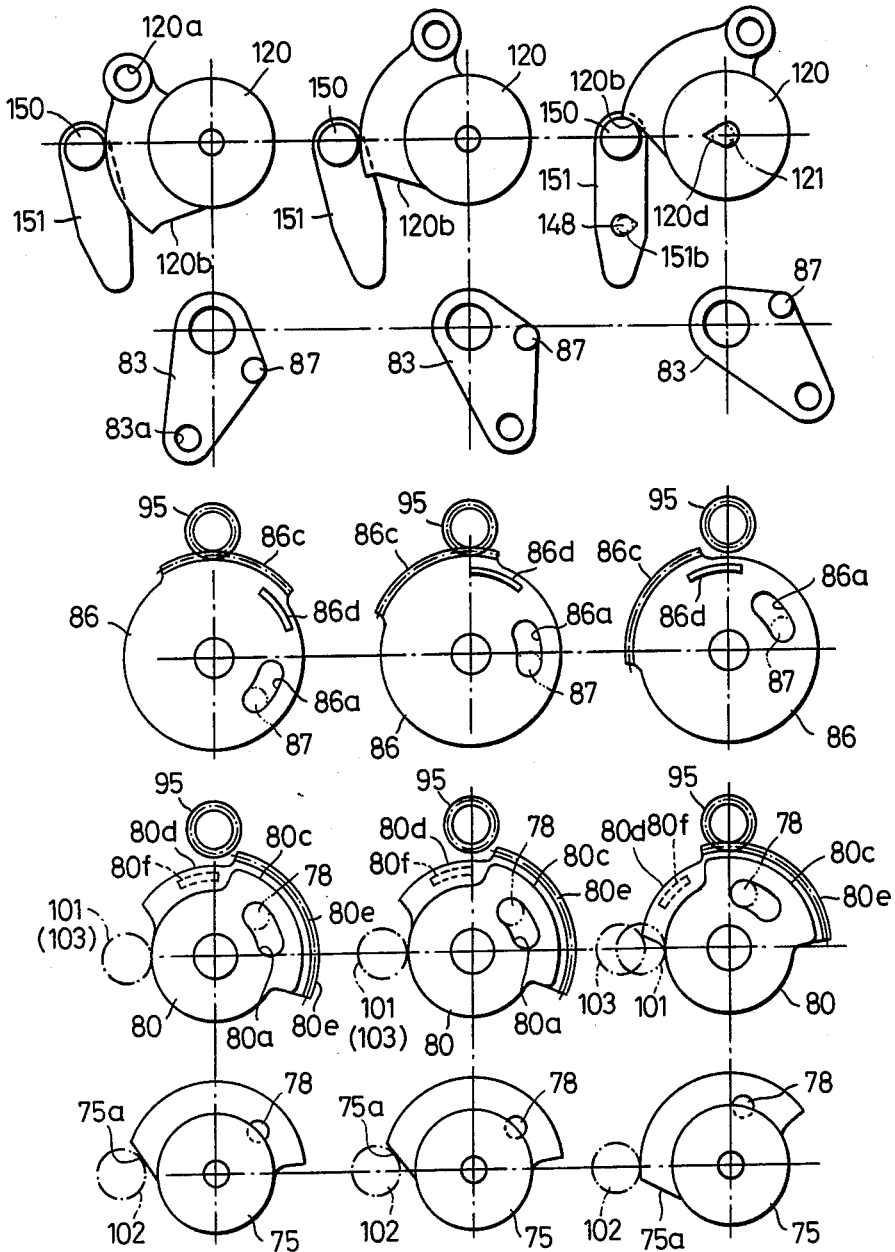

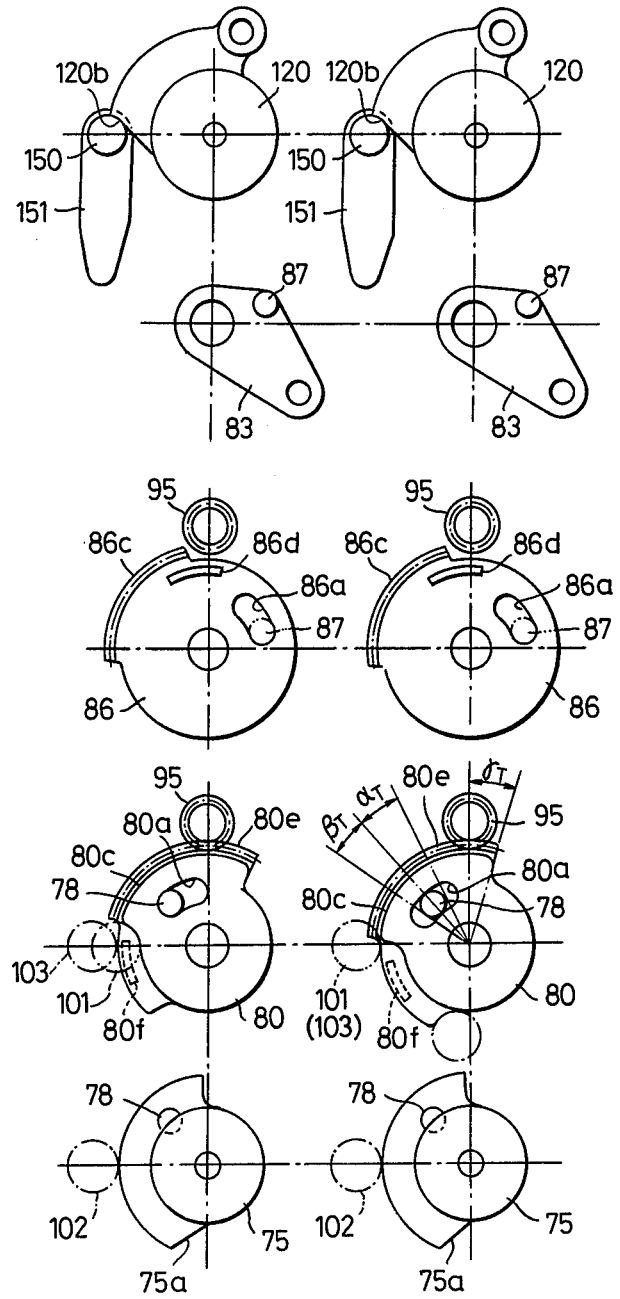

TAPE LOADING APPARATUS IN A RECORDING AND/OR REPRODUCING APPARATUS

BACKGROUND OF THE INVENTION

This invention relates generally to apparatus for drawing out a tape from a cassette to place it along a predetermined tape path in a recording and/or reproducing apparatus, and more particularly to a tape loading apparatus in which the operation of drawing out the tape is carried out while reel motors on the tape-supply reel side and on the tape-takeup reel side generate rotational force to impart small and equal torque to the reels in the direction of winding tape thereon.

Among conventional video tape recording and/or reproducing (VTR) apparatus for use with tape cassettes, there are some in which the tape is drawn out of the cassette to form a specific tape path which brings the tape into contact with an address head in the stop mode. The tape is made to travel at high speed along the above tape path thus carrying out a random-access operation. This type of apparatus is designed so that a braking force is mechanically applied to each reel disc during the operation of drawing the tape out of the cassette, so as to impart an appropriate tension on the tape being drawn out of the cassette. In the actual operation of this apparatus, the mechanical braking operation does not work as well as might be desired and problems arise. For example, the tape drawn out of the cassette may be imparted with an excessive tension or conversely may be left to slack.

In the case where most of the tape is wound on one or the other of the reels inside the cassette, operation of drawing out the tape may cause all the tape to be drawn off the other reel so that an excessive tension is imparted to the tape. As a further disadvantageous result, the tape may be damaged.

SUMMARY OF THE INVENTION

Accordingly, it is a general object of the present invention to provide a novel and useful tape loading apparatus in which the above described difficulties have been overcome.

Another and specific object of the invention is to provide a tape loading apparatus in which the operation of drawing the tape out of the cassette is carried out while both of the reel motors operate to impart small torques of equal value to their associated reels in their respective tape winding directions. According to this invention, the tape drawing-out operation is carried out in a stable manner while imparting minimal tension to the tape, in accordance with the winding of the tape within the cassette, and further while imparting small load to the tape drawing-out mechanism.

Still another object of the invention is to provide a tape loading apparatus in which two tape drawing-out members move in an interrelated manner starting from different time points. According to this invention, the tape is drawn out of the cassette at substantially constant speed from the beginning to the end of the tape drawing-out operation, whereby no slack is produced in the tape.

Other objects and further features of the invention will be apparent from the following detailed description with respect to preferred embodiments of the invention when read in conjunction with the accompanying drawings.

BRIEF DESCRIPTION OF THE DRAWING

In the drawings:

FIG. 2 is a front view, partly in vertical section, of the apparatus illustrated in FIG. 1;

FIG. 3 is a diagrammatic plan view showing the tape drawing-out system of the tape loading apparatus shown in FIG. 1 after completion of tape retraction;

FIG. 4 is a vertical section showing the mechanism for exerting rotational force in the apparatus illustrated in FIG. 1;

FIGS. 5 and 6 are respectively vertical sections of the tape drawing-out mechanism on the tape-takeup side, taken along the lines V—V and VI—VI in FIG. 3, as viewed in the arrow direction;

FIG. 8 is a plan view showing the tape drawing-out mechanism on the tape-supply side;

FIG. 9 is a vertical section taken along the line IX—IX in FIG. 8, as viewed in the arrow direction;

FIG. 10 is a plan view showing the relationship between a cam block and a pressure arm after completion of tape retraction;

FIG. 11 is a view showing the relationship between a drive arm and a drive gear on the tape-supply side after completion of tape retraction;

FIG. 12 is a plan view showing a mechanism for exerting a clockwise rotational force on a tape drawing-out arm on the tape-takeup side after completion of tape retraction;

FIGS. 15A through 15E are exploded views showing the tape drawing-out mechanisms on the tape-supply side and on the tape-takeup side at different time instants in the tape drawing-out mode of operation.

DETAILED DESCRIPTION

Figure 1:
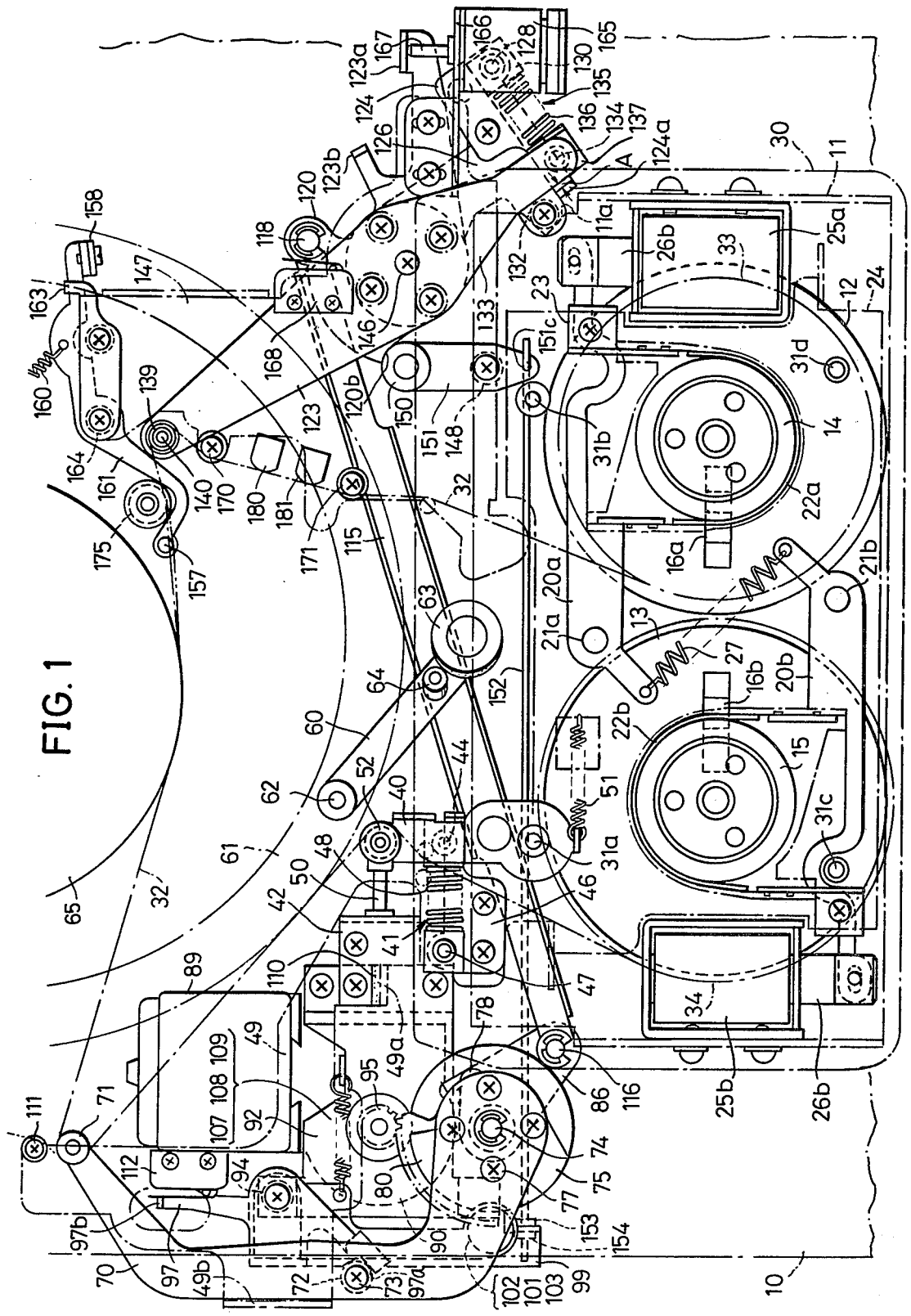
FIG. 1 is a plan view showing one embodiment of the tape loading apparatus according to the present invention after completion of the tape drawing-out operation.
Figure 7:
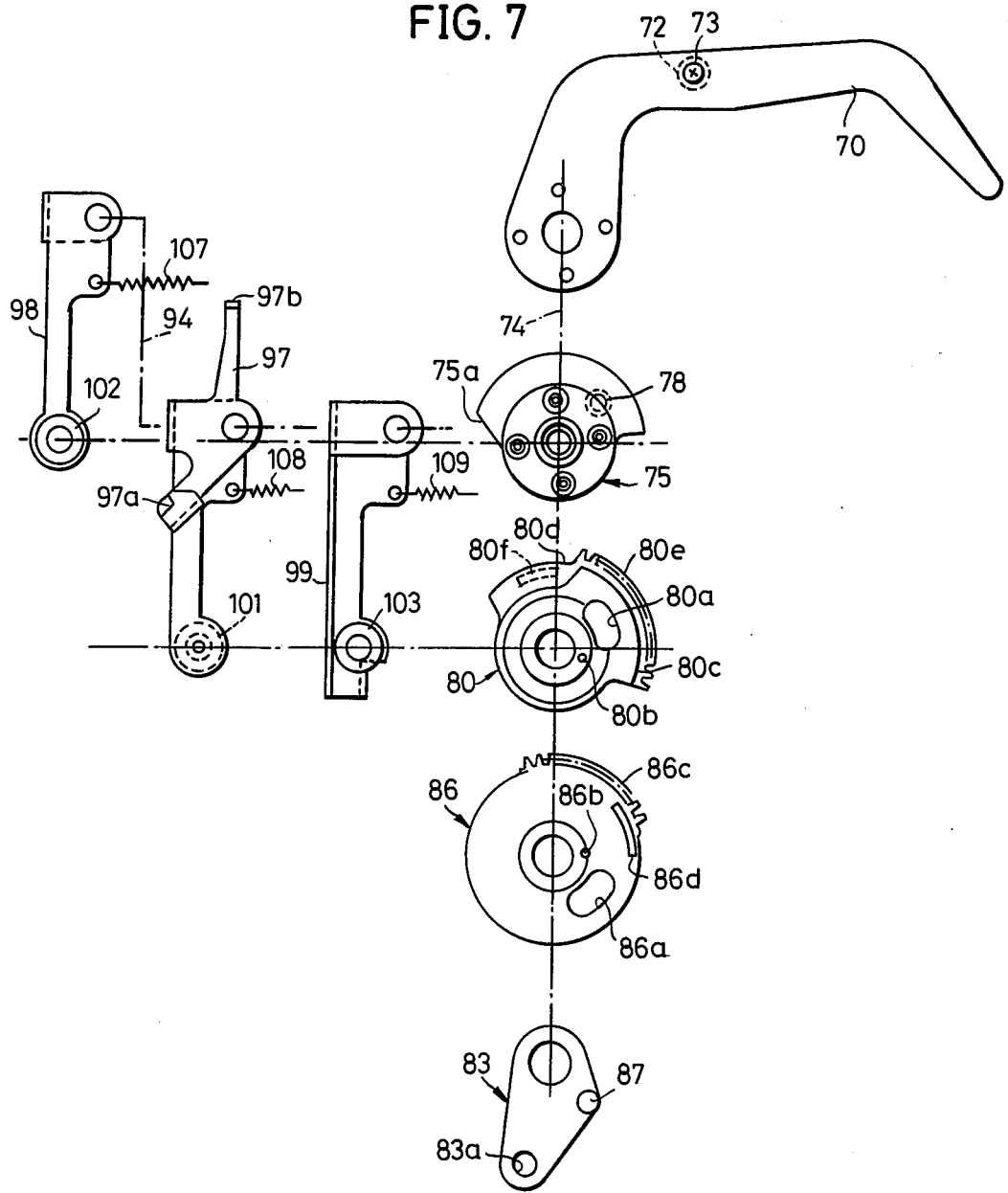
FIG. 7 is an exploded view of the mechanism illustrated in FIGS. 5 and 6, after completion of tape storage, with rotary members and their associated arms in their respective positions.

Referring to FIGS. 1 and 2, a description is first given of the structural organization of a tape loading apparatus in a recording/reproducing apparatus according to the present invention.

Above a main deck 10 is positioned a reel deck 11 which supports therebelow a supply reel motor 12 and a takeup reel motor 13 in a side-by-side relationship. Reel disc assemblies 14 and 15 are fixed on the respective shafts of reel motors 12 and 13. Reel disc assemblies 14 and 15 have slitted skirt parts, which cooperate with photo couplers 16a and 16b to detect the rotational speeds of the reel discs.

Brake arms 20a and 20b are respectively pivoted on pins 21a and 21b. A brake band 22a is anchored at one end to a bend in the arm 20a and at the other end to a bracket 23. This brake band 22a surrounds the supply-side reel disc assembly 14 and is guided by a guide plate 24. Another brake band 22b is provided arond the take-up-side reel disc 15, similar to the above described brake band 22a. The brake arms 20a and 20b are connected at their free ends to plungers 26a and 26b of solenoids 25a and 25b. A spring 27 is stretched between the other ends of the brake arms 20a and 20b.

A tape cassette 30 is supported on support pins 31a through 31d and is thereby held in a specific position in the recording/reproducing apparatus. This cassette contains a supply-side tape roll 33 and a takeup-side tape roll 34, of a magnetic tape 32 having the tape width of ¾-inch, for example.

A tension control arm 40 is pivoted on the pin 31a. In association with this arm 40, there are provided a rotation urging device 41 and a position detection device 42 of a differential transformer type.

The rotation urging device 41 is of the structure shown in FIG. 4. A pipe 43 is pivoted at one end on a pin 44 embedded in the arm 40. A rod 45 is pivoted at one end on a pin 47 embedded in a holder plate 46 which is fixed to the guide plate 24. The rod 45 is slidably fitted into the stationary pipe 43. Silicon grease having a high viscosity is applied on the sliding surfaces between the rod 45 and the pipe 43, which silicon grease functions as a damper. A coil spring 48 is fitted around the pipe 43 to urge the arm 40 to rotate clockwise as viewed in FIG. 1.

The position detection device 42 is mounted on a guard plate 49. This device 42 has a detection rod 50, which is urged to move in the right direction as viewed in FIG. 1 by a built-in coil spring, having a small spring constants and makes contact with the lateral surface of the arm 40 at its free end. As the arm 40 rotates, the rod 50 shifts to vary the output voltage of the detection device 42. This output voltage controls the braking force on the reel motor 13.

The rotational force of the arm 40 due to the detection rod 50 is cancelled by a spring 51 stretched between the proximal end of the arm 40 and a bend in the guide plate 24. The arm 40 has a tension roller 52 at the distal end thereof.

A pinch roller arm 60 is pivoted at one end thereof on a pin 62 embedded in a loading ring 61. The arm 60 supports a pinch roller 63 rotatably at the free end thereof and further a tape catching roller 64 near the pinch roller 63. When the ring 61 revolves, the roller 64 functions to catch the tape 32 forming a tape loop outside the cassette 30 and pull it around a guide drum 65.

Next a description is given of the structure of the tape drawing-out mechanism with reference to FIGS. 5 through 12. Firstly, the tape drawing-out mechanism on the tape-takeup side is described, with reference to FIGS. 5 through 7.

A tape drawing-out arm 70 on the tape-takeup side supports a guide roller 71 rotatably at the free end thereof and has a lock ring 72 fastened by a screw 73 at an intermediate part thereof. The arm 70 is fixed at the proximal end thereof to an arm holder 75 which is rotatably supported on a shaft 74 embeddedly fixed to the main deck 10. Four screws 77 and associated coil springs 76 are used to fix the arm 70 to the arm holder 75, and screws 77 are adjusted so that the guide roller 71 is held parallel with the shaft 74. The arm holder 75 has a pin 78 embedded therein. The pin 78 projects downwardly to fit into an arcuate slot 80a of a tape drawing-out drive gear 80. The gear 80 is fitted rotatably around a small radius column part of the arm holder 75. A torsion spring 81 is provided around a center column part of the arm holder 75 with one end arm thereof inserted into a hole 80b of the gear 80 and the other end arm engaged with the pin 78. The spring 81, having a stored spring force, urges the arm holder 75 to turn counterclockwise and the gear 80 to turn clockwise.

A drive arm 83 is caulked to a bushing 84 which is rotatably fitted around the shaft 74. A gear 86 for actuating the supply-side mechanism is fitted rotatably on the bushing 84. A pin 87 on the drive arm 83 fits into an arcuate slot 86a of the gear 86. A torsion spring 88 is provided between the gear 86 and the arm 83, with one end arm thereof inserted into a hole 86b of the gear 86 and the other end arm engaged with the pin 87, so that it urges the gear 86 and the arm 83 to turn counterclockwise and clockwise respectively.

The arm holder 75 has a cam 75a which cooperates with a roller 102 on a position holding arm 98, as described further below.

The gear 80 has cams 80c and 80d respectively formed at the top and bottom thereof. The top cam 80c cooperates with a roller 101 of an end lock arm 97, and the bottom cam 80d with a roller 103 of a lock actuation arm 99, as described later. The bottom cam 80d has a gear part 80e formed therearound over a specific angular extent and further a projection 80f projected downwards at a specific position. The gear 86 has a gear part 86c formed therearound over a specific angular extent and further has an upright projection 86d which will come to abut against the projection 80f.

The tape drawing-out mechanism of the above described construction is operated by a motor 89 and a power unit 90 which is comprised of a worm gear and a worm wheel. The power unit 90 is mounted on a holder 92 which is supported above the main deck 10. The power unit 90 has a gear 95 which meshes with the gear parts 80e and 86c successively. The gear 95 meshes with the gear part 86c in the tape-retracted state indicated in FIG. 3 and with the gear part 80e in the tape-drawn out state indicated in FIG. 1. The arms 97, 98 and 99 are rotatably supported on a shaft 94 in stacked arrangement.

The end-lock arm 97, at the uppermost position, is urged to turn counterclockwise by a spring 108. The roller 101 supported at the free end of the arm 97 faces the top cam 80c of the gear 80. A hook 97a for locking is formed in the upper bent part of the arm 97.

The position holding arm 98 is positioned inside the arm 97 which is U-shaped in cross-section and is urged to turn counterclockwise by a spring 107. The roller 102 at the free end of the arm 98 opposes the cam 75a of the arm holder 75.

The lock actuation arm 99, at the lower position, is similarly urged to turn counterclockwise by a spring 109. The roller 103 at the free end of the arm 99 confronts the bottom cam 80d of the gear 80.

A pad 110 is bonded on a bent part 49a of the guard plate 49 as indicated in FIG. 3. The pad 110 prevents impact noise when the arm 70 abuts thereagainst in the tape retracted mode of operation described later. On the guard plate 49 are provided a tape guide pole 111 (FIG. 1) and a microswitch 112 for detecting the rotational position of the end-lock arm 97.

A connection arm 115 has pins 116 and 118 embeddedly fixed thereto, one on each end. The pin 116 fits into a hole 83a of the arm 83 and the other pin 116 into a hole 120a in a cam block 120 of a tape-drawing out mechanism on the tape-supply side. That is, the connection arm 115 connects the tape-drawing out mechanisms on the tape-takeup and the tape-supply sides.

Next, a description is given of the tape-drawing out mechanism on the tape-supply side, with reference to FIGS. 8 through 10.

The cam block 120 is fitted rotatably on a shaft 121 at the lower part thereof. The shaft 121 is embeddedly fixed to the main deck 10. A rotatable arm plate 126 is fixed to the top of the cam block 120. A holder plate 124 having a pin 128 embedded therein is screw fastened to the arm plate 126.

An arm holder 142 is supported rotatably on the shaft 121 at the upper part thereof. A head mounting plate 147 is fastened by a screw 146 to the top of the shaft 121. A tape drawing-out arm 123 and an arm 133 are respectively fixed to the top and the bottom of a flange part of the arm holder 142. The arm 123 is adjusted by screws which cooperate with coil springs 143 so that a shaft 140 at a free end thereof is aligned parallel with the shaft 121. A tension roller 139 is rotatably supported by a roller bearing 138 on the shaft 140. A pin 134 is fixed to the arm 133, at the distal part thereof.

A rotation urging device 135 is provided between pins 128 and 134 as shown in FIG. 1. The mechanism of the device 135 is the same mechanism as the device 41 illustrated in FIG. 4, and is composed of a pipe 137, a rod 130, and a coil spring 136. A lock pin 132 is fixed to the arm plate 126.

A pressure arm 151 is pivoted on a pin 148 on the main deck 10, and has a pressure pole 150 supported at a free end thereof, as indicated in FIG. 1. The pole 150 pushes a slant cam 120b of the cam block 120 and urges the cam block 120 to rotate clockwise, when the tape drawing-out operation is completed. A connecting rod 152 is anchored at one end thereof to the free end of the arm 99 by two nuts 153 and 154. A bent part of the other end of the rod 152 is engaged with a hole 151c of the arm 151. Accordingly, the arms 99 and 151 are rotated in an intercoupled operation by way of the rod 152.

A head mounting plate 147 is provided at a predetermined height position. On this plate 147 are mounted an address head 180 and a full-width erasing head 181, each of which comes into contact with the tape 32 between tape guides 170 and 171 on the plate 147. An arm 161 for adjusting the tape path is rotatably supported on a pin 164 on the plate 147, and has a guide pole 157 fixed at one end thereof. This arm 161 is continuously urged to turn counterclockwise by a spring 160, but is limited in this turning, in the position indicated in FIG. 1, by a stop plate 163 screw fastened to the plate 147.

A position detection device 165 is mounted on a bracket 166 fixed to the plate 147. A detection rod 167 continually makes contact with a bent part 123a of the arm 123. This position detection device 165 has the same structure as the device 42. A microswitch 168 is disposed on the plate 147 and is adapted to detect the completion of the tape retraction operation, in cooperation with a bent arm 123b of the arm 123.

Next, the operation of the tape loading apparatus of the above construction will be described.

First, definitions will be given for the terms used to indicate the modes of operation in the present specification. The term "tape drawing-out" means the operation of drawing the tape out of a video cassette to cause the tape to assume the tape path indicated in FIG. 1. The term "tape retraction" means the operation of winding tape pulled outside cassette as indicated in FIG. 1 to return and accommodate it within the video cassette as indicated in FIG. 3. The term "tape pulling-around" means the operation of further pulling the tape from the tape path indicated in FIG. 1 into a tape path around the guide drum 65 wherein recording/reproduction can be carried out.

The recording and/or reproducing apparatus provided with the above described tape loading apparatus assumes a stop mode of operation after the completion of the tape drawing-out operation, as indicated in FIGS. 1 and 2. Fast-foward or rewinding operations are performed in this state.

First to be described is the state of the various parts at the time of the completion of the tape drawing-out operation. Referring to FIGS. 1 and 2, the solenoids 25a and 25b are deenergized. The arms 20a and 20b are thereby turned by the spring 27 to tighten their associated brake bands 22a and 22b. Accordingly, the reel disc assemblies 14 and 15 have a braking force applied thereto.

Consider the tape drawing-out mechanism on the tape-supply side. The arm plate 126 is urged to rotate clockwise due to the pushing action of the pole 150 against the slant cam part 120b of the cam block 120. Plate 126 is turned to its terminal position where the lock pin 132 fits into a V-shaped groove 11a of the reel deck 11. The arm 123 is in a rotational position where the rotational force exerted thereon in the clockwise direction is due to the expansion force of the coil spring 136 and a rotational force exerted thereon in the counterclockwise direction is due to the tension of the tape 32 guided by the tension roller 139. These two rotational forces are balanced. When the tape tension increases, the arm 123 turns counterclockwise and the spring 136 is compressed. As the arm 123 turns further, the end of the pipe 137 comes into contact with a flange of the rod 130 so that the tape tension directly acts on the rotational arm plate 126 and the cam block 120. Conversely, with a decrease in the tape tension, the arm 123 is turned clockwise by the expansion force of the spring 136, whereby the gap A in FIG. 1 is narrowed to substantially zero.

Next, consider the tape drawing-out mechanism on the tape-takeup side. The arm 70 is limited in its clockwise and counterclockwise rotation and is held stationary, with the lock ring 72 engaged with the hook 97a of the arm 97 and the lateral side of the arm 97 pressed against a bent part 49b of the guard plate 49.

The arm 161 is turned counterclockwise so that the guide pole 157 makes contact with the tape 32 from the outside of the tape loop, as indicated in FIG. 1. The tape path is formed along the two-dot chain lines in the same figure at the prescribed the tape height position within the cassette 30. The tension control arm 40 is at a rotational position where the expansion force of the coil spring 48 and the tape tension counterbalance each other, similarly as in the case of the corresponding arm 123 on the tape-supply side.

Next, a description is given of the tape drawing-out operation which starts from the fully retracted state.

When in the tape retracted state, that is, when the cassette 30 has just been inserted, the apparatus is in the state indicated in FIG. 3. That is, the tape drawing-out arms 70 and 123 on the tape-takeup side and on the tape-supply side are turned clockwise and counterclockwsie respectively.

The cam block 120 and the arm plate 126 are urged to turn counterclockwise by the spring force of the torsion spring 88 by way of the connecting arm 115. The arm 133 is engaged by a bent part 124a of the holder plate 124 and is turned counterclockwise, which, in turn, forces the arm 123 to turn counterclockwise. This arm 123 is held stationary with the shaft 140 at the free end thereof pressing against a part B of the plate 147. The microswitch 168 is actuated by the bent arm part 123b of the arm 123, which microswitch 168 delivers a signal indicating the assumption of the tape retracted state to the control system of the apparatus.

The arm 83 and the gear 86 are in the relationship indicated in FIG. 11. The pin 87 is positioned at the center of the slot 86a, and the torsion spring 88 is charged with spring force. The gear 86 is in meshed engagement with the gear 95 of the power unit 90, and is stopped at this rotational position. Accordingly, the arm 83 is biased to rotate counterclockwise, which rotational force, in turn, is transmitted through the connecting arm 115 to the cam block 120 to urge it in the clockwise direction.

The arm holder 75 is being pushed at the slant cam part 75b by the roller 102 as indicated in FIG. 12, whereby the roller 102 urges the arm holder 75 together with the arm 70 to turn clockwise. The arm 70 is held stationary, pressed against the pad 110 (FIG. 3).

When the cassette 30 is placed in its operational position (FIG. 1) in the state described above, the tension roller 139 and the guide roller 71 respectively enter into the cassette 30 within the tape loop. The cassette 30 thus placed pushes a microswitch (not shown), thus delivering a tape drawing-out signal to the control system of the apparatus.

Responsive to this signal, the tape drawing-out operation begins in such a way that the arm 123 firstly starts to turn clockwise. At the instant when the arm 123 reaches the midway point in its rotation, the arm 70 on the tape-takeup side starts to rotate counterclockwise, and the arms 123 and 70 reach their terminal positions, in that order.

A more detailed description will now be given. Responsive to incoming tape drawing-out signal, the solenoids 25a and 25b are actuated to turn their associated arms 20a and 20b, which thereby slacken the brake bands 22a and 22b to release the braking force on the reel disc assemblies 14 and 15.

Figure 13:
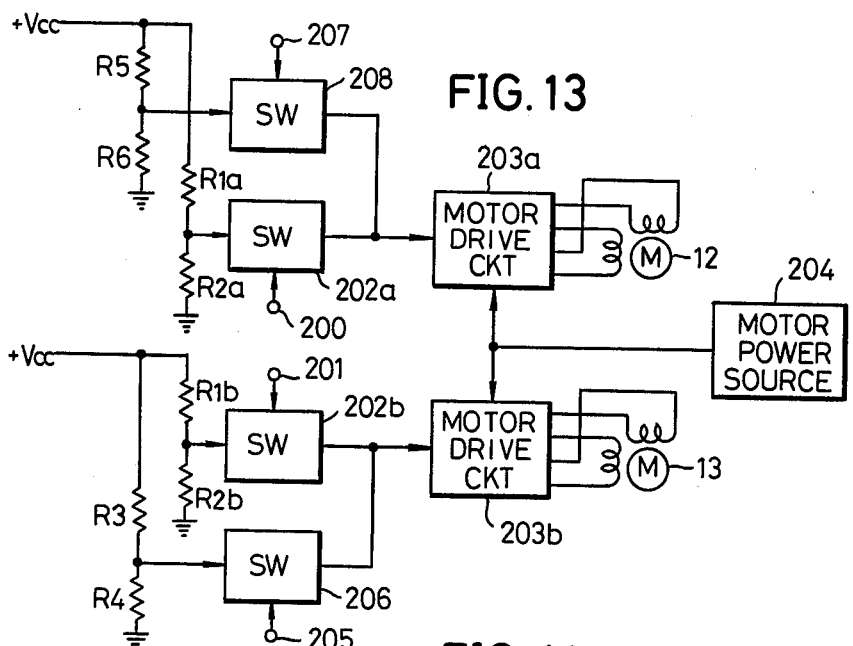
FIG. 13 is a circuit diagram showing one embodiment of a circuit for controlling the rotation of a reel motor.

Referring to FIG. 13, the tape drawing-out signal is applied to terminals 200 and 201 to close switch circuits 202a and 202b. Accordingly, as for the tape-supply side reel motor 12, a reference voltage +Vcc is divided by resistors R1a and R2b to obtain a control voltage, which is fed to a motor driving circuit 203a. A voltage from a motor power source 204 is controlled in the circuit 203a responsive to the control voltage, and is then applied to the motor 12. As for the tape-takeup side motor 13, the voltage from the power source 204 is similarly controlled in a motor driving circuit 203b responsive to a control voltage which is obtained by dividing the reference voltage by resistors R1b and R2b, and is then applied to the motor 13. Here, since R1a=R1b and R2a=R2b, the same voltage is applied to each of the motors 12 and 13, which thereupon generate the same rotational torque of about 100 gr-cm in the tape-takeup direction, as indicated in FIGS. 14(A) and 14(B).

Accordingly, the tape drawing-out operation from the cassette 30 is carried out in a manner such that the back tension applied to the tape is automatically minimized, as described further below.

Furthermore, responsive to the tape drawing-out signal, the motor 89 (FIG. 1) starts to rotate. In the tape retracted state, the gear 95 meshes with the gear part 86c of the gear 86 as indicated in FIG. 11 but is disengagement from the gear part 80e of the gear 80.

When the motor 89 starts to rotate, the gear 95 rotates clockwise, which causes the gear 86 (FIG. 11) to turn counterclockwise over the angular extent of gear part 86c. The gear 86 initially rotates for about 15 degrees independently of the arm 83 until the pin 87 reaches the end of the slot 86a, and then rotates together with the arm 83.

The rotation of the arm 83 is transmitted by way of the connecting arm 115 to the cam block 120, which thereby rotates clockwise together with the rotatable arm plate 126. As the arm plate 126 rotates, the arm 123 is pushed by the coil spring 136 of the device 135 to turn clockwise. The tension roller 139 is extracted from the interior of the cassette 30 to catch the tape 32 and draw it out of the cassette 30, thus initiating the tape drawing-out operation on the tape-supply side.

When the gear 86 has rotated for a specific angle (26 degrees), the arm 123 reaches the position indicated by single-dot chain lines in FIG. 3, and the component members of tape drawing-out driving mechanism assume the state indicated in FIG. 15B. A projection 86d of the gear 86 comes to abut against a projection 80f of the gear 80, whereby the gear 80 thereafter rotates together with the gear 86. As the gear 80 rotates, the arm holder 75 and the arm 70 are rotated clockwise by the torsion spring 81. The guide roller 71 is extracted from the cassette 30 to catch the tape 32 and draw it out of the cassette 30, thus initiating the tape drawing-out operation on the tape-takeup side.

When both gears 86 and 80 rotate, the arms 123 and 70 carry out tape drawing-out operation side by side. When the supply side arm 123 reaches the terminal position, the members of the tape drawing-out mechanism assume the state indicated in FIG. 15C.

Somewhat before the tape drawing-out mechanism reaches the state indicated in FIG. 15C, the roller 103 is guided by the cam 80d to rotate the arm 99 clockwise counter to the spring 109, which, in turn, rotates the pressure arm 151 clockwise by way of the connecting rod 152. The pole 150 pushes the slant cam 120b to urge the cam block 120 and the arm plate 126 to rotate clockwise, the cam block 120 thereby being rotated somewhat to be locked. Locking is made in a state where the cam block 120 is limited in its counterclockwise rotation by the pole 150 on the slant cam 120b thereof and the arm plate 126 is limited in its clockwise direction by the lock pin 132 entering into the V-shaped cut 11a of the reel deck 11.

Furthermore, center holes 151a and 120c of the arm 151 and the cam block 120 respectively have V-shaped cuts 151b and 120d at specific angular positions. These V-shaped cuts 151b and 120d act to limit any play at journal parts of the arm 151 and the cam block 120.

The arm 123 now reaches the position illustrated in FIG. 1 and indicated by two-dot chain lines in FIG. 3, where the bent part 123a thereof is brought into contact with the free end of the detection rod 167 of the position detection device 165.

The rotation of the gear 95 is then transmitted to the gear part 80e of the gear 80, which thereby rotates counterclockwise. The tape drawing-out operation on the tape-takeup side thereby continues. When the gear 80 further rotates for a specific angle (about 60 degrees), the arm 70 reaches the terminal position, where the arm 70 abuts against the bent part 49b of the plate 49 and is restricted in its further rotation in the counterclockwise direction. The tape drawing-out driving mechanism now assumes the state indicated in FIG. 15D.

The gear 95 rotates further for an angle $B_T$. The gear 80 thereby rotates counterclockwise counter to the torsion spring 81, and the pin 78 moves in the slot 80a. As the gear 95 rotates the cam 80c pushes beyond the roller 101 to turn the end lock arm 97 clockwise counter to the spring 108. The hook 97a of the lock arm 97 catches the lock ring 72, to restrict the arm 70 from rotation in the clockwise direction. As a result, the arm 70 on the tape-takeup side is held securely at the terminal position clamped between the bent part 49b and the hook 97a.

Whereupon the arm 97 is rotated, the microswitch 112 is operated by a bent part 97b at the free end of the arm 97, thus delivering a tape drawing-out completion signal to the control system of the recording/reproducing apparatus. Responsive to this signal, the motor 89 comes to a stop after inertial rotation. The tape drawing-out driving mechanism now assumes the state illustrated in FIG. 15E. In this state, an angle $\alpha_T$ is set larger than an angle $\gamma_T$. In this connection, even if the gear 95 should continue to rotate due to some malfunction, the gear 80 is not driven to rotate, whereby the danger of damage to the apparatus can be obviated.

Figure 14:
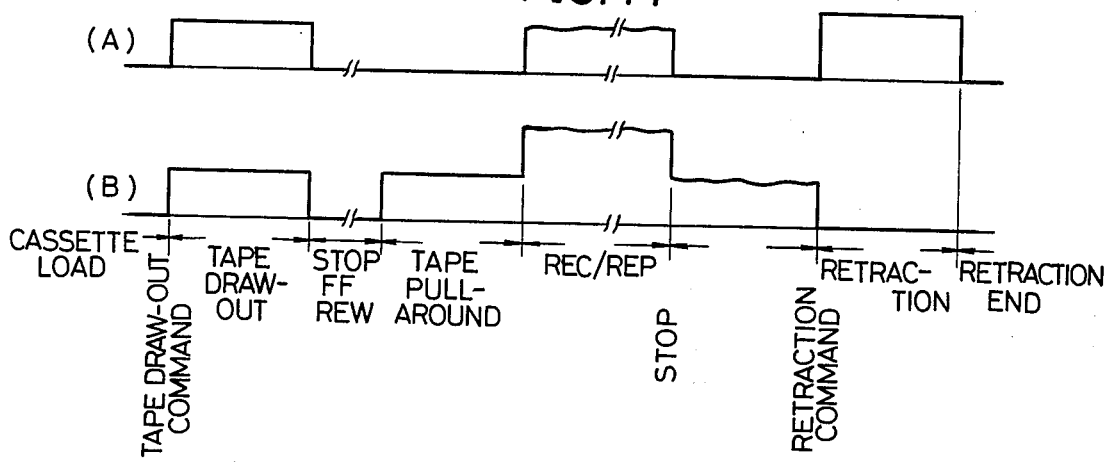
FIGS. 14(A) and 14(B) are diagrammatic charts showing rotational torques generated in the reel motors on the tape-supply side and on the tape-takeup side in various operational modes of an apparatus according to the invention.

Moreover, responsive to the above tape drawing-out completion signal, the pair of solenoids 25a and 25b are deenergized. The brake bands 22a and 22b are thereupon tensioned by the spring 27 to apply braking force to the reel disc assemblies 14 and 15. In addition, the above signal opens the switching circuits 202a and 202b, which, in turn, cut off voltage to the reel motors 12 and 13. Accordingly, the rotational torque generated by the motors 12 and 13 becomes zero, as illustrated in FIG. 14.

The recording/reproducing apparatus thereby assumes a state in which the tape is fully drawn out as indicated in FIG. 1. The tape 32, which has been drawn from the supply-side tape roll 33, is guided by the tape guide 171 and is then placed in contact with the full-width erasing head 181 and the address head 180 in that order. The tape 32 is then guided by the tape guide 170, the tension roller 139, and a tape guide 175 on the drum base structure (not shown). The inclined guide pole 157 eliminates the difference in tape tension in the width direction which is caused by the difference in level between the supply-side tape roll and the takeup-side tape roll. This tape 32 makes contact with a part of the guide drum 65. Thereafter, the tape 32 is guided by the guide roller 71, passes by the tension roller 52, and reaches the tape-takeup side tape roll 34 inside the cassette 30.

As described above, the tape drawing-out operation is performed in a manner such that the arm 123 and the arm 70 start their rotational operation at different time instants, and continue rotation while maintaining a predetermined relationship therebetween. This relationship is determined so that the length of the tape path formed outside the cassette 30 increases at a constant rate over the whole tape drawing-out mode of operation, as indicated by a curve I in FIG. 16. That is, the speed at which the tape is drawn out of the cassette is kept substantially constant over the whole process of tape drawing-out operation. Accordingly, the tape drawing-out operation is carried out stably without excessive back tension in the tape or variation of load on the tape drawing-out mechanism.

Figure 16:
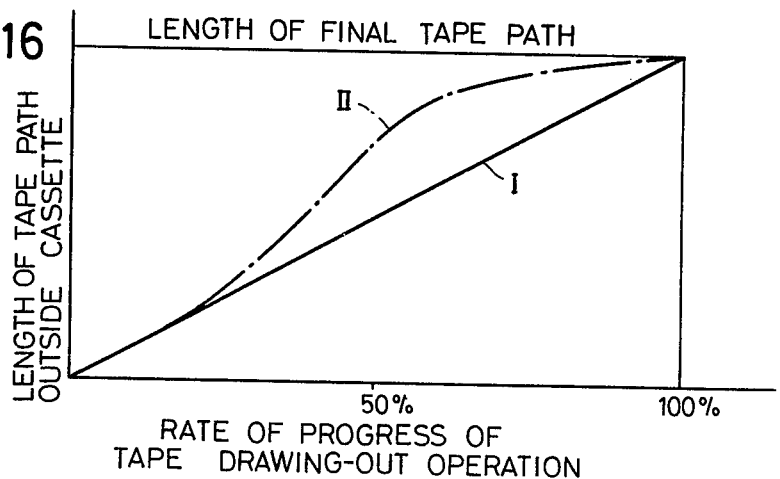
FIG. 16 is a graph showing the relationship between the tape drawing-out operation and the length of the tape path.

If the arms 70 and 123 were to be rotated simultaneously, the length of the tape path outside the cassette would change with the progress of the tape drawing-out operation as indicated by a curve II in FIG. 16. Therefore, during the tape drawing-out operation, the speed at which the tape is drawn out of the cassette would change greatly and this would result in application of excessive force on the tape.

Next, a description is given of the condition of the tape drawn out of the cassette in the tape drawing-out mode of operation.

In the tape drawing-out mode of operation, the reel motors 12 and 13 generate substantially equal rotational torque in the tape takeup direction, that is, in the counterclockwise direction, as indicated in FIGS. 14(A) and 14(B). Accordingly, the tape is automatically drawn out from the tape roll having smaller resistance against drawing of the tape, a factor which depends on the nature of the particular cassette in use, to form the tape path. Particularly, in the case where there is a large difference between the diameters of the tape rolls, the drawing out of the tape is accompanied by a tape taking-up operation on the tape roll with small diameter.

More specifically, the tape operates as described below, depending on the tape roll size inside of the cassette 30.

① Most of the tape is in the supply-side tape roll and little or no tape is in the takeup-side tape roll:

Tape is drawn out of cassette while being taken up on the takeup-side tape roll as it travels from the supply-side tape roll toward the takeup-side tape roll.

② Diameter of supply-side tape roll is somewhat larger than that of takeup-side tape roll:

The takeup-side tape roll does not move and the tape is drawn out of cassette from the supply-side tape roll.

③ Diameter of supply-side tape roll and that of takeup-side tape roll are substantially equal:

Tape is drawn out of cassette from both tape rolls.

④ Diameter of takeup-side tape roll is somewhat larger than that of supply-side tape roll:

The supply-side tape roll does not move and the tape is drawn out of cassette from takeup-side tape roll.

⑤ Most of the tape is in the takeup-side tape roll and little or no tape is in the supply-side tape roll:

Tape is drawn out of cassette while being taken up on the supply-side tape roll as it travels from the takeup-side tape roll toward the supply-side tape roll.

Accordingly, the tape is drawn from the tape roll from which the tape may be paid out easily, that is, it is drawn out of cassette smoothly with the minimum tape tension. This is very advantageous from the aspect of protecting the tape. Moreover, it becomes possible to obviate the difficulties which arise when all the tape is drawn off one side or the other as this causes an excessive force to be applied to the tape and, moreover, causes the tape leader near the fixed end of the tape to be drawn out of the cassette 30. The drawn out leader may contact with the guide drum 65 and may possibly damage the rotary magnetic heads.

In the state described above, the recording/reproducing apparatus can be placed in fast-forward or rewinding mode of operation. When the tape travels at high speeds, a control signal or address signal recorded on the tape are reproduced by the address head 180, whereby a random access operation for rapidly detecting a specific position is carried out.

At the time of fast-forward mode of operation, the takeup reel motor 13 rotates in cooperation with the photocoupler 16b. A voltage is applied from a position detection device 165 to the reel motor 12 on the tape supply side, whereby a braking force is imparted thereto, and the tape 32 travels with its back constant tension. The rewinding operation is also carried out with the tape tension similarly controlled.

When, during fast tape travel operation, an address signal or the like reproduced by the address head 180 coincides with a preset value, the recording and reproducing apparatus stops the fast tape travel, and the operation assumes the tape pulling-around mode or the tape retracting mode.

The tape pulling-around operation is accomplished by the ring 61 revolving clockwise to a specific position, and the tape 32 is engaged by the roller 64, drawn out from the tape reel on the takeup side, pulled around the outer cylindrical surface of the drum 65, and is placed in loaded state along a specific path in a closely wrapped state around the drum 65 over substantially 180 degrees of angle. When the ring 61 reaches the final position, the leaf spring 158 is pushed by the pinch roller arm 60, whereby the tape path adjusting arm 161 rotates clockwise, overcoming the force of the spring 160, and the guide pole 157 retracts from the track path and separates from the tape 32. The tape guided by the tape guide 175 directly reaches the guide drum 65 as indicated by single-dot chain line.

Furthermore, in response to the command for pulling around the tape, a signal is applied to a terminal 205, and a switching circuit 206 closes. This causes a reference voltage to be applied as control voltage divided by the resistors R5 and R6 to the motor driving circuit 203b. A driving voltage responsive to this control voltage is applied to the motor 13, which thereupon produces a torque (of approximately 100 gram-cm.) in the tape takeup direction. On one hand, the reel motor 12 on the tape-supply side is in stopped state, and the reel disc 14 is stopped, being held by a braking force (reference being made to FIG. 14). As a result, the tape pulling around operation is carried out as the tape 32 is drawn out from the tape reel on the takeup side, overcoming the above mentioned torque in the takeup direction.

Upon completion of the loading, the apparatus assumes either the recording or the reproducing mode. At the time of this mode of operation, both of the tape tension control mechanisms on the supply side and the takeup side, and the torques of the motors 12 and 13 vary as indicated in FIG. 14, whereby the tape tension is caused to be constant.

In the fast-forward mode, the rewinding mode, and the recording and reproducing modes of operation, the tension roller 139 rotates in accordance with the tape travel. Accordingly, by detecting the rotation of the tension roller 139 by means such as an optical means and counting the number of revolutions, the actual tape travel length in each of the above mentioned operational modes can be determined from the corresponding counted value.

The tape unloading operation, which is the reverse of the above described tape pulling around operation, is carried out by taking up the tape on the tape roll 34 on the takeup side as the tape tension is controlled (reference being made to FIG. 14). The apparatus in this case assumes the state shown in FIG. 1.

When, with the apparatus in this state, ejecting operation is carried out, and a tape retraction command is produced. When this retraction command arrives at the control system of the apparatus, the pair of solenoids 25a and 25b are energized, whereby the reel disc assemblies 14 and 15 are released from braking force.

In response to the retraction command, also, a signal arrives at the terminal 207 in FIG. 13, and the switching circuit 208 closes. As a consequence, a voltage resulting from the voltage division of the reference voltage by resistors R5 and R6 is applied as a control voltage to the motor driving circuit 203a, and the reel motor 12 on the supply side receives a driving voltage responsive to this control voltage and produces a torque (approximately 150 gram-cm.) in the tape takeup direction. On the other hand, no driving voltage is supplied to the reel motor 13 on the takeup side.

As still another result of the retraction command, the motor 89 rotates in reverse direction, and the tape drawing out mechanism operates in a sequence which is the reverse of that at the time of tape drawing out mode. The arm 70 on the takeup side and the arm 123 on the supply side rotate successively in the clockwise and counterclockwise directions. In this case, the proportion in which the length of the tape path formed by these arms 70 and 123 decreases is substantially constant over the entire process step of the tape retracting operation as indicated by the curve I in FIG. 16. For this reason, in accordance with the successive rotations of these arms 70 and 123, the tape 32 outside of the cassette is wound up on the reel on the supply side by the motor 12 without slackening and is accommodated within the cassette 30.

When the arm 123 on the supply side rotates to the final position indicated in FIG. 3, the microswitch 168 is pressed by the arm part 123b and becomes "ON", and a tape retraction ending command is sent to the control system. As a consequence, the solenoids 25a and 25b are deenergized, and braking forces act on the two reel disc assemblies 14 and 15. In addition, the current to the motor 89 is cut off, and, after continuing to rotate under momentum for a short time, comes to a stop. As a result of the rotation of the motor 89 under momentum, the gear 80 rotates through an angle $\delta_S$ as shown in FIG. 11. In this case, the angle $\alpha_S$ of rotation of the gear 86 until the end of the slot 86a contacts the pin 87 is made greater than the angle $\gamma_S$ through which the gear 86 can be rotated by the gear 95. For this reason, even in the case wherein the motor 89 continues to rotate because of some failure, the apparatus is not subjected to excessive stress, and there is no possibility of trouble such as damage to the apparatus.

As a result of the above mentioned stopping of the motor 89, the apparatus assumes the tape retraction completion state shown in FIG. 3. Thereafter, the cassette 30 rises and is ejected from its loading position.

Further, this invention is not limited to these embodiments but variations and modifications may be made without departing from the scope of the invention.

What is claimed is:

1. A video cassette tape player comprising means for supporting a tape supply reel and a tape takeup reel with a length of tape extending between said reels; separate motor means individually associated with each of said reels for selectively transporting said tape back and forth between said reels; means for pulling said length of tape from said reels and into a predetermined tape path; means for normally holding said reels immobile against random rotation; means responsive to a playback command signal for releasing said holding means, starting said pulling means, and energizing said motor means; means for feeding back a control signal for applying a minimum driving power to each of said motor means in order to maintain a predetermined and balanced tension in said length of said tape while it is being pulled into said predetermined tape path; and means responsive to said tape reaching said predetermined tape path for reapplying said holding means, stopping said pulling means, and controlling the power applied to each of said motor means.

2. A tape-loading device in an apparatus for recording and/or reproducing information signals on and/or from a recording tape, said tape-loading device comprising: a first tape drawing out means rotating to draw tape out of a cassette; a second tape drawing out means rotating to draw the tape out of the cassette; means for causing the first and second tape drawing out means to rotate in a mutually interrelated manner such that the two tape drawing out means start operating at respectively different instants of time, a supply-side reel motor for driving a reel disc on a tape-supply side in the cassette; a takeup-side reel motor for driving a reel disc on a takeup-side in the cassette; and an electrical circuit operating when the tape-loading means draws out the tape to apply voltages to the reel motors on the supply-side and the takeup-side such that an equal rotational torque is produced in each of the two motors in the direction of winding up the tape.

3. A tape-loading device as claimed in claim 2 and means for locking the first and second tape drawing out means at a final position after drawing out the tape.

4. A tape-loading device as claimed in claim 2 further having circuit means for applying to the supply-side reel motor a voltage such that a rotational torque is produed in the supply-side motor for winding up the tape when the tape-loading means moves in the direction opposite to that in which it moves at the time of drawing out the tape.

* * * * *